(12) United States Patent
Sakurai

(10) Patent No.: US 11,705,608 B2
(45) Date of Patent: Jul. 18, 2023

(54) BATTERY CELL AND BATTERY MODULE

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/496,454

(22) Filed: Oct. 7, 2021

(65) Prior Publication Data

US 2022/0131241 A1 Apr. 28, 2022

(30) Foreign Application Priority Data

Oct. 27, 2020 (JP) .............................. JP2020-179917

(51) Int. Cl.
*H01M 50/54* (2021.01)
*H01M 50/557* (2021.01)
*H01M 10/0585* (2010.01)
*B60L 50/64* (2019.01)
*H01M 50/103* (2021.01)
*H01M 50/517* (2021.01)

(52) U.S. Cl.
CPC ............. *H01M 50/54* (2021.01); *B60L 50/64* (2019.02); *H01M 10/0585* (2013.01); *H01M 50/103* (2021.01); *H01M 50/517* (2021.01); *H01M 50/557* (2021.01); *H01M 2220/20* (2013.01)

(58) Field of Classification Search
CPC ............... H01M 50/54; H01M 50/517; H01M 50/103; H01M 50/557; H01M 10/0585; H01M 2220/20
See application file for complete search history.

(56) References Cited

U.S. PATENT DOCUMENTS

2012/0114994 A1* 5/2012 Kurahashi ............ H01M 50/569
429/90
2019/0131665 A1 5/2019 Iwakura et al.
(Continued)

FOREIGN PATENT DOCUMENTS

JP 2008-218065 A 9/2008
JP 2010-113816 A 5/2010
JP 2012-104341 A 5/2012
(Continued)

OTHER PUBLICATIONS

Jun. 14, 2022, Japanese Office Action issued for related JP Application No. 2020-179917.

*Primary Examiner* — Jane J Rhee
(74) *Attorney, Agent, or Firm* — Paratus Law Group, PLLC

(57) ABSTRACT

A battery cell includes: an electrode unit including a positive electrode, a negative electrode, a current collector, and a separator; a housing unit accommodating the electrode unit; a first insulator disposed inside the housing unit and between the electrode unit and the housing unit, an internal terminal disposed inside the housing unit and electrically connected to the current collector; a second insulator disposed inside the housing unit and between the internal terminal and the housing unit; and an external terminal disposed outside the housing unit. A contact surface of the first insulator with the electrode unit has indented shape. The first insulator is fixed to the housing unit.

13 Claims, 8 Drawing Sheets

(56) References Cited

U.S. PATENT DOCUMENTS

2019/0259988 A1* 8/2019 Doi .................... H01M 50/564
2020/0035975 A1   1/2020 Cho et al.

FOREIGN PATENT DOCUMENTS

| JP | 2012-212506 A | 11/2012 |
| JP | 2014-199782 A | 10/2014 |
| JP | 2015-162411 A | 9/2015 |
| JP | 2017-084540 A | 5/2017 |
| JP | 2019-079737 A | 5/2019 |

* cited by examiner

51(52)

51(52)

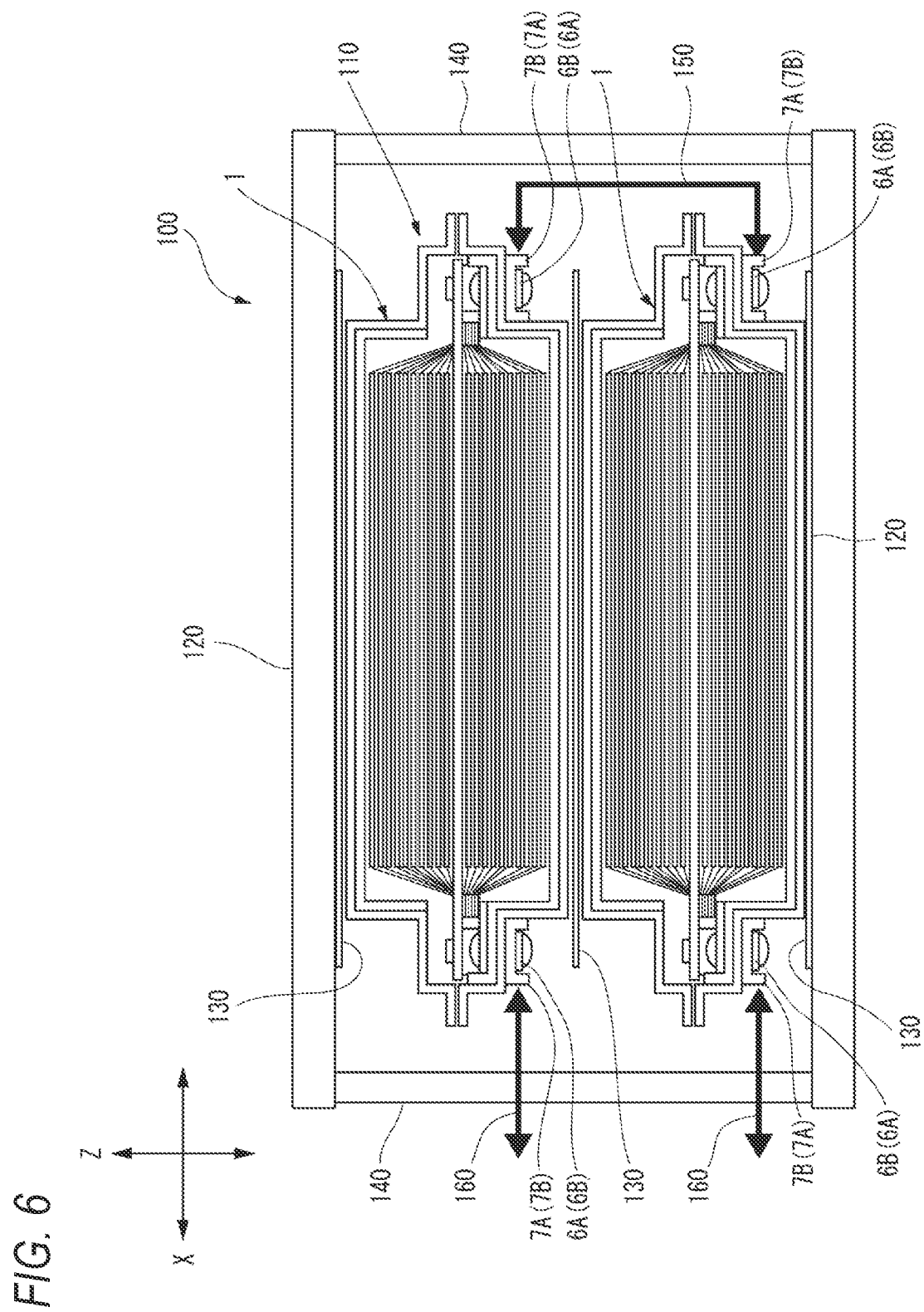

BATTERY CELL AND BATTERY MODULE

CROSS-REFERENCE TO RELATED APPLICATION

This application is based on and claims priority under 35 USC 119 from Japanese Patent Application No. 2020-179917, filed on Oct. 27, 2020, the contents of which are incorporated herein by reference.

TECHNICAL FIELD

The present invention relates to a battery cell and a battery module mountable on an electric vehicle or the like.

BACKGROUND ART

There have been a battery cell that includes: an electrode unit having a positive electrode, a negative electrode, a current collector, and a separator; and a housing unit accommodating the electrode unit and a battery module in which a plurality of battery cells is accommodated. For example, JP2012-212506A discloses a laminated battery cell in which a laminated film is used as a housing unit, an external terminal is extended to the inside of the laminated film housing unit to be electrically connected to a tab-stacked body, and the laminated film housing unit and the external terminal are heat-sealed via a contact layer.

As for the laminated film housing unit, a contact layer can be heat-sealed. If the housing unit is a thick material such as a metal plate, however, it is not easy to heat-seal the contact layer to fix the external terminal or the like, and thereby components being prone to be loose.

SUMMARY

The present invention provides a battery cell and a battery module in which electrode units are not loose to improve their durability.

A battery cell according to the present invention includes:
an electrode unit including a positive electrode, a negative electrode, a current collector, and a separator;
a housing unit accommodating the electrode unit;
a first insulator disposed inside the housing unit and between the electrode unit and the housing unit;
an internal terminal disposed inside the housing unit and electrically connected to the current collector;
a second insulator disposed inside the housing unit and between the internal terminal and the housing unit; and
an external terminal disposed outside the housing unit, in which
a contact surface of the first insulator with the electrode unit has indented shape, and
the first insulator is fixed to the housing unit.

A battery module according to the present invention includes:
a cell-stacked body in which a plurality of the battery cells described above are stacked; and
a pair of end plates disposed at both ends in a stacking direction, in which
the external terminals of the battery cells adjacent to each other are electrically connected by a bus bar.

According to the present invention, since the housing unit and the first insulator are fixed, a jolt of the electrode unit caused by a jolt of the housing unit can be suppressed by indented shape of the first insulator. Thus, deterioration of the electrode unit is suppressed, thereby durability of the battery cell being improved.

BRIEF DESCRIPTION OF DRAWINGS

FIG. 6 is a sectional view schematically showing a battery module including the battery cell of FIG. 1.

DESCRIPTION OF EMBODIMENTS

Figure 1:
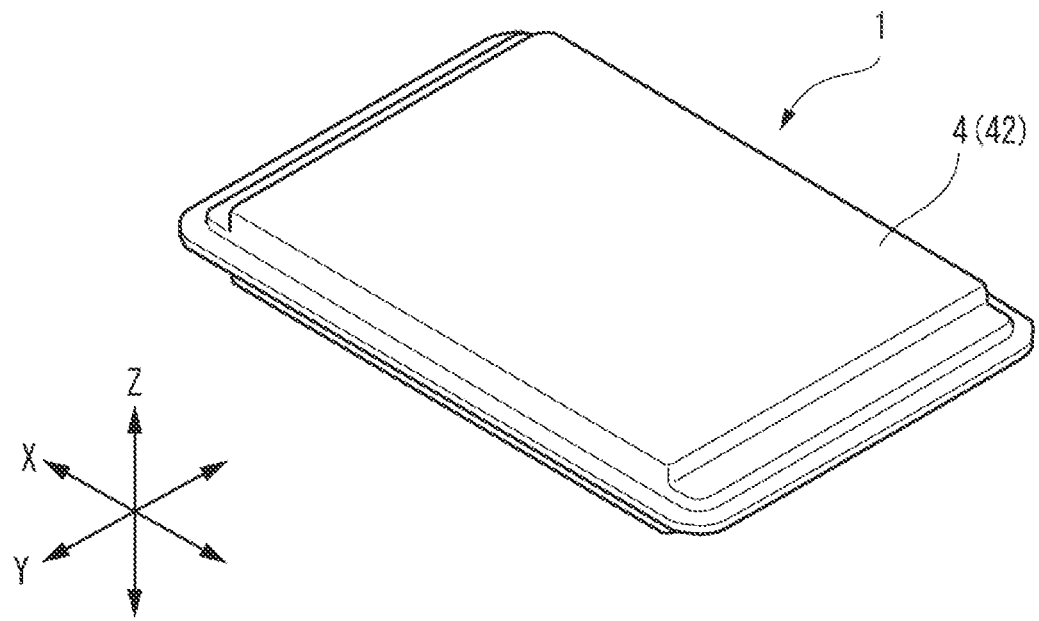
FIG. 1 is a perspective view of a battery cell according to a first embodiment of the present invention as viewed from diagonally above.
Figure 2:
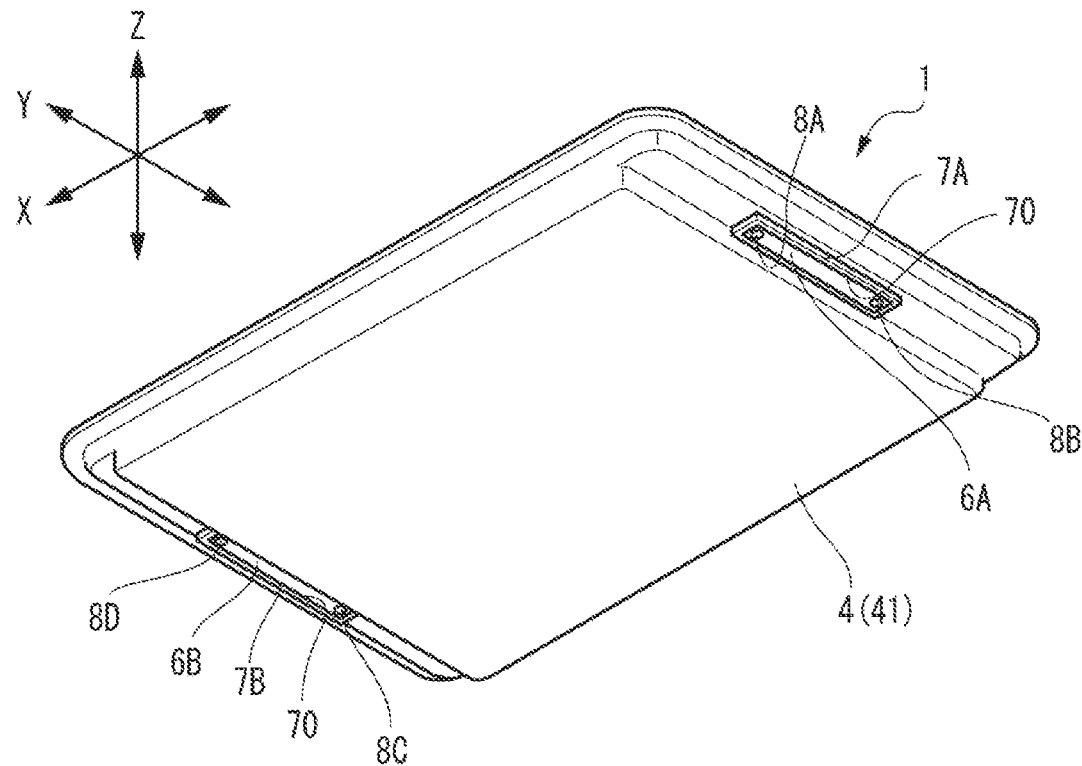
FIG. 2 is a perspective view of the battery cell of FIG. 1 as viewed from diagonally below.
Figure 3A:
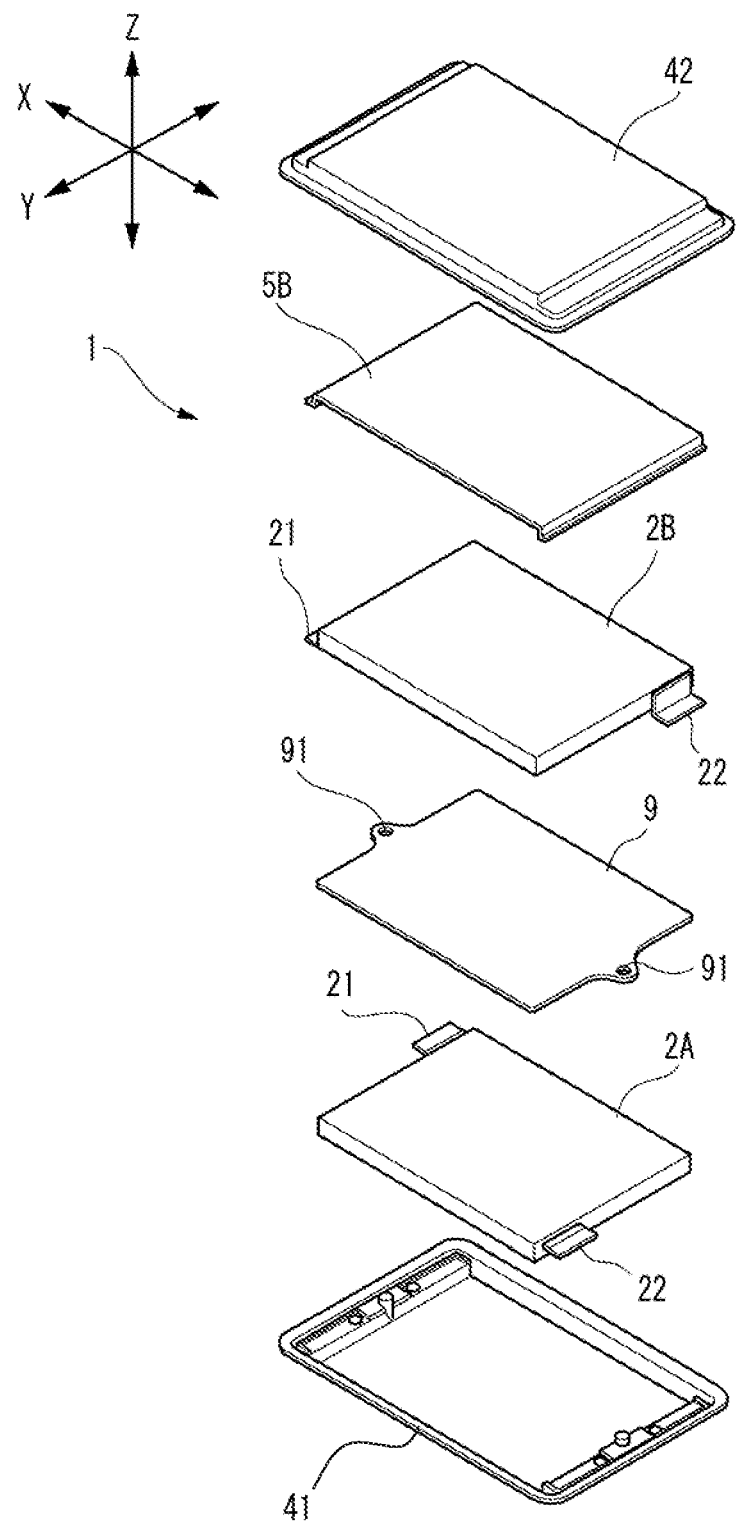
FIGS. 3A and 3B are exploded perspective views of the battery cell of FIG. 1.
Figure 3B:
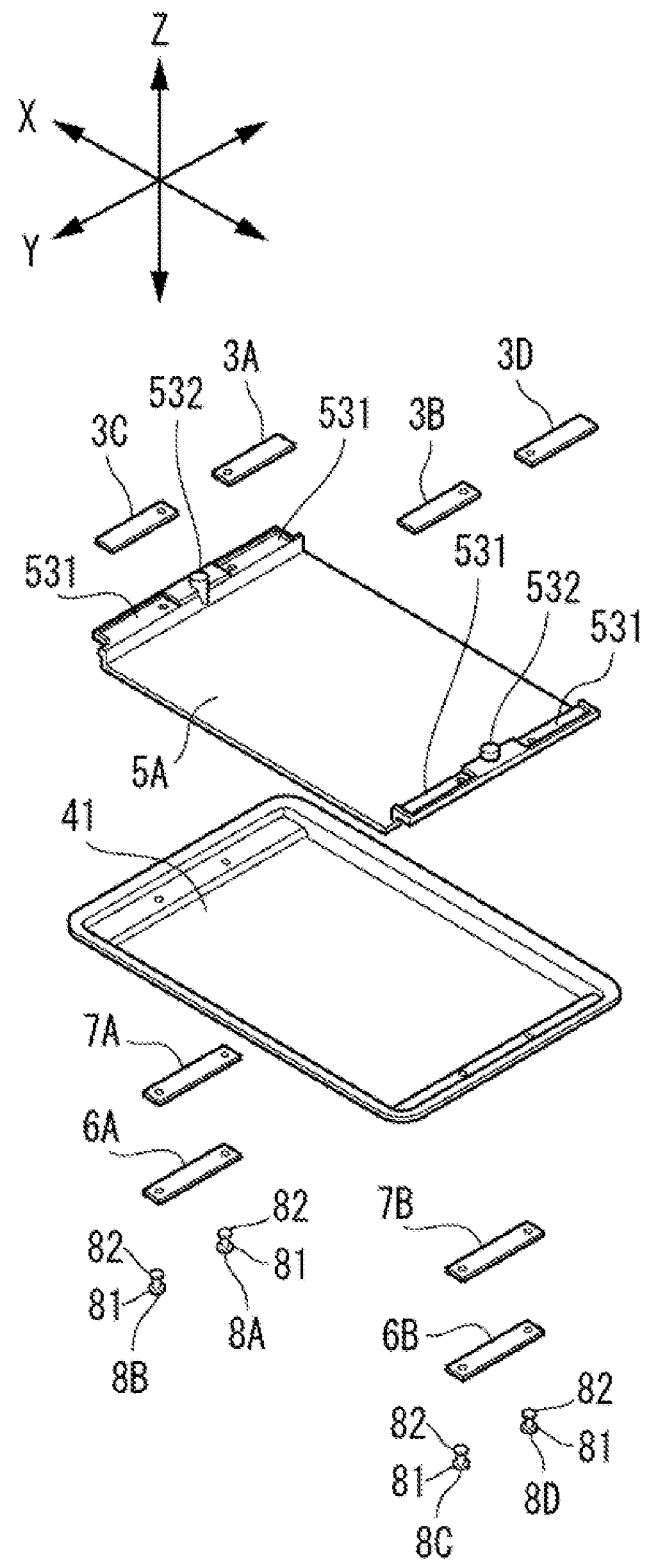
Figure 4:
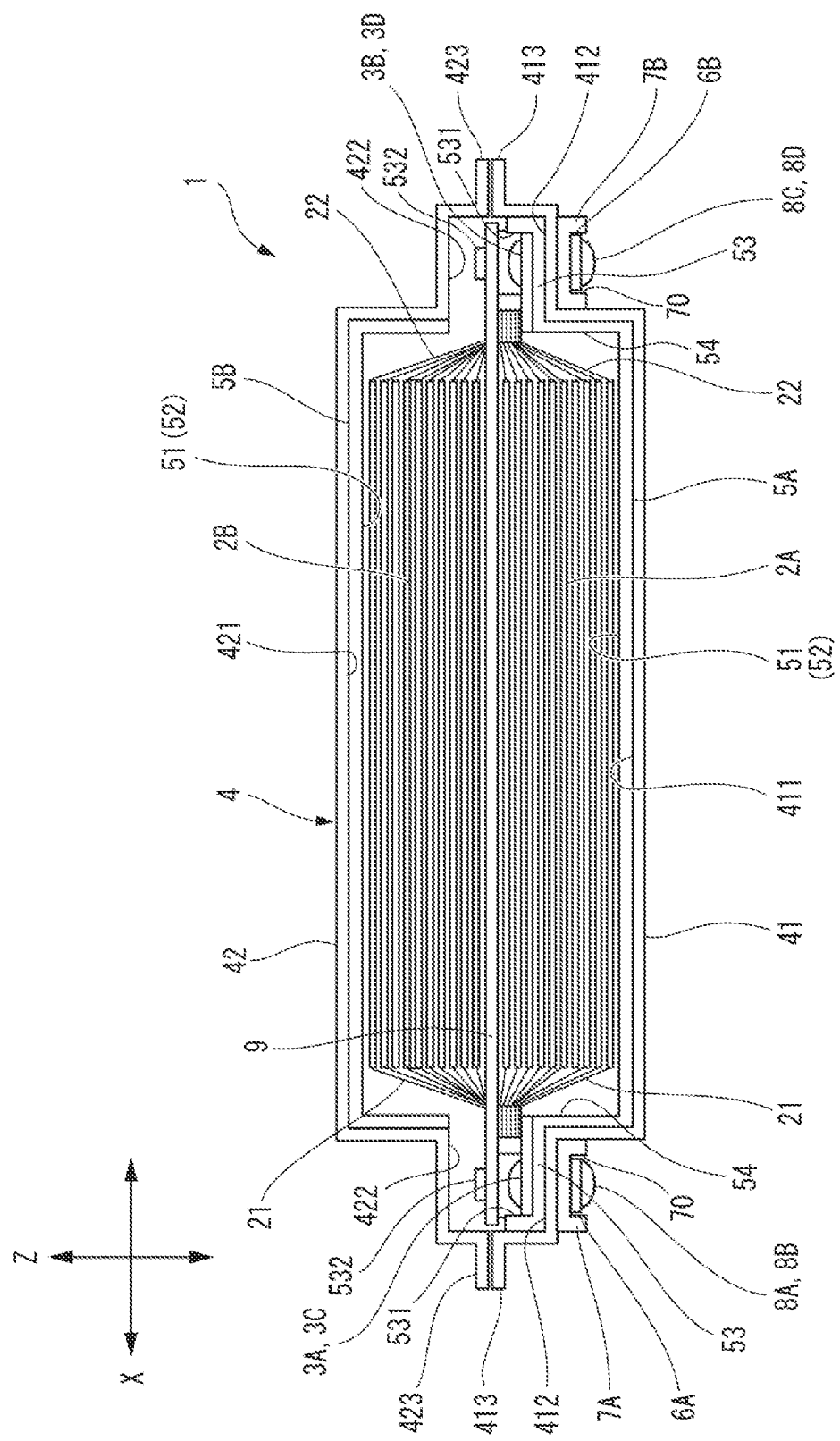
FIG. 4 is a sectional view of the battery cell of FIG. 1.

Hereinafter, embodiments of a battery cell and a battery module according to the present invention will be described with reference to the drawings. In the following, a longitudinal direction of the plate-shaped battery cell is referred to as an X-direction, a thickness direction of the battery cell as a Z-direction, and a direction orthogonal to the X-direction and the Z-direction as a Y-direction.

First Embodiment

First, a battery cell according to a first embodiment of the present invention will be described with reference to FIGS. 1 to 6.

Battery Cell

As shown in FIGS. 1 to 4, a battery cell 1 includes: electrode units 2A and 2B; internal terminals 3A to 3D electrically connected to the electrode units 2A and 2B; a housing unit 4 accommodating the electrode units 2A and 2B and the like; internal insulators 5A and 5B disposed between the electrode unit 2A or 2B and the housing unit 4 and between the internal terminals 3A to 3D and the housing unit 4; external terminals 6A and 6B disposed outside the housing unit 4; external insulators 7A and 7B disposed between the external terminal 6A or 6B and the housing unit 4; and fixing members 8A to 8D. In the battery cell 1 according to the present embodiment, a middle plate 9 is disposed between a pair of the electrode units 2A and 2B in order to accommodate the pair of the electrode units 2A and 2B piled in the Z-direction. The middle plate 9 is omitted, however, in a battery cell accommodating a single electrode unit (for example, a battery cell 1B according to a second embodiment shown in FIGS. 7 and 8).

Electrode Units

The electrode units 2A and 2B are each a stacked body of a positive electrode, a negative electrode, and a separator. A positive-electrode current-collector 21 (for example, aluminum foil) extends at one end portion in the X-direction of each positive electrode, and a negative-electrode current-collector 22 (for example, copper foil) at the other end portion in the X-direction of each negative electrode. The current collectors 21 and 22 are staggered in the Y-direction so that the positive-electrode current-collectors 21 in the electrode units 2A and 2B do not overlap in the Z-direction nor do the negative-electrode current-collectors 22 in the electrode units 2A and 2B.

Internal Terminals

The internal terminals 3A to 3D are conductive plate-shaped members. A first positive-electrode internal terminal 3A (for example, pressed aluminum material) is electrically connected to the positive-electrode current-collector 21 of the electrode unit 2A. A first negative-electrode internal terminal 3B (for example, pressed copper material) is electrically connected to the negative-electrode current-collector 22 of the electrode unit 2A. A second positive-electrode internal terminal 3C (for example, pressed aluminum material) is electrically connected to the positive-electrode current-collector 21 of the electrode unit 2B. A negative-electrode second internal terminal 3D (for example, pressed copper material) is electrically connected to the negative-electrode current-collector 22 of the electrode unit 2B. The internal terminals 3A to 3D and the current collectors 21 and 22 are electrically connected by laser beam welding or the like.

Housing Unit

The housing unit 4 includes: a first housing member 41 (for example, pressed aluminum material) covering the electrode units 2A and 2B from one side in the Z-direction; and a second housing member 42 (for example, pressed aluminum material) covering the electrode units 2A and 2B from the other side in the Z-direction. The first housing member 41 includes: an electrode-unit accommodating portion 411 that accommodates the electrode unit 2A; a pair of internal-terminal accommodating portions 412 that accommodate the internal terminals 3A to 3D and are terraced and adjacent to both sides of the electrode-unit accommodating portion 411 in the X-direction; and a flange portion 413 that is formed circularly on the periphery of the first housing member 41 and is joined to the second housing member 42 by welding or the like.

The second housing member 42 includes: an electrode-unit accommodating portion 421 that accommodates the electrode unit 2B; extension portions 422 that extend the internal-terminal accommodating portion 412 of the first housing member 41 and are terraced and adjacent to both sides of the electrode-unit accommodating portion 421 in the X-direction; and a flange portion 423 that is formed circularly on the periphery of the second housing member 42 and is joined to the flange portion 413 of the first housing member 41 by welding or the like.

Internal Insulators

The internal insulators 5A and 5B are, for example, molded polypropylene. A first internal insulator 5A is disposed between the electrode unit 2A and the first housing member 41, and a second internal insulator 5B is disposed between the electrode unit 2B and the second housing member 42. The first internal insulator 5A is fastened together with the internal terminals 3A to 3D, the first housing member 41, the external insulators 7A and 7B, and the external terminals 6A and 6B but may be fixed to the first housing member 41 by adhesion, heat-sealing, welding, or the like. In addition, the second internal insulator 5B is fixed to the second housing member 42 by adhesion, heat-sealing, welding, or the like.

Figure 5A:
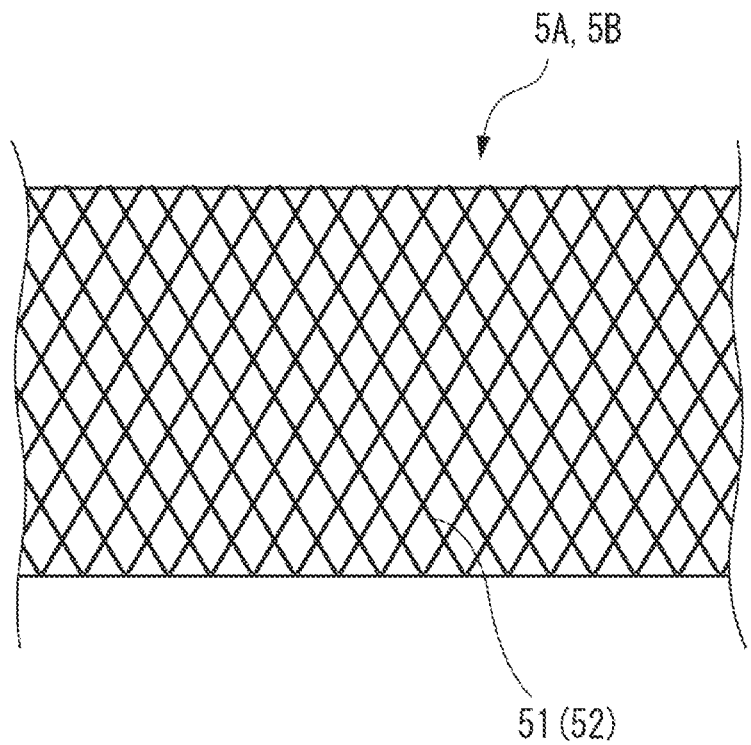
FIG. 5A is a view showing an example of an electrode-unit contact portion of an internal insulator of the battery cell of FIG. 1.
Figure 5B:
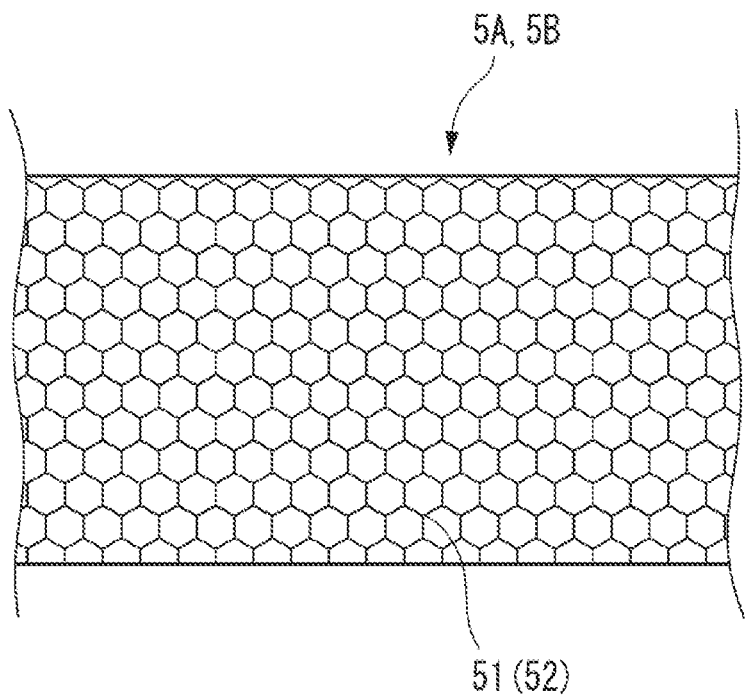
FIG. 5B is a view showing another example of the electrode-unit contact portion of the internal insulator of the battery cell of FIG. 1.

As shown in FIGS. 5A and 5B, contact surfaces 51 of the internal insulators 5A and 5B with the electrode units 2A and 2B have indented shape. For example, the contact surface 51 shown in FIG. 5A has an oblique mesh pattern, and the contact surface 51 shown in FIG. 5B has a hexagon-shaped pattern, both of whose convex portions (wire portions) are in contact with the electrode unit 2A. According to such a contact surface 51, since the electrode units 2A and 2B bite into the indented shape of the internal insulators 5A and 5B, the electrode units 2A and 2B can be prevented from moving in the X-direction and the Y-direction.

The first internal insulator 5A is disposed between the electrode unit 2A and the first housing member 41 and integrally includes: an electrode-unit insulating portion 52 having the contact surface 51; internal-terminal insulating portions 53 disposed between the internal terminals 3A to 3D and the first housing member 41; and connection portions 54 connecting the electrode-unit insulating portion 52 and the internal-terminal insulating portions 53. The electrode-unit insulating portion 52 and the internal-terminal insulating portions 53 may be formed integrally via the connection portions 54 or separately.

The internal-terminal insulating portion 53 is provided with internal-terminal accommodating concave portions 531 accommodating the internal terminals 3A to 3D. Specifically, in the internal-terminal insulating portion 53 provided on one side of the first internal insulator 5A in the X-direction, the internal-terminal accommodating concave portion 531 accommodating the first positive-electrode internal terminal 3A and the internal-terminal accommodating concave portion 531 accommodating the second positive-electrode internal terminal 3C are formed side by side in the Y-direction. In addition, in the internal-terminal insulating portion 53 provided on the other side of the first internal insulator 5A in the X-direction, the internal-terminal accommodating concave portion 531 accommodating the first negative-electrode internal terminal 3B and the internal-terminal accommodating concave portion 531 accommodating the second negative-electrode internal terminal 3D are formed side by side in the Y-direction. Thicknesses of the internal terminals 3A to 3D are equal to or less than heights of the internal-terminal accommodating concave portions 531, so that the internal terminals 3A to 3D do not protrude. Between the internal-terminal accommodating concave portions 531 of internal-terminal insulating portion 53, there are formed positioning convex portions 532 fitting into positioning holes 91 of the middle plate 9 to position the middle plate 9.

Middle Plate

The middle plate 9 is, for example, molded polyphenylene sulfide and is disposed between the pair of the electrode units 2A and 2B. Contact surfaces of the middle plate 9 with the electrode units 2A and 2B preferably have indented shape similarly to the contact surfaces 51 of the internal insulators 5A and 5B with the electrode units 2A and 2B. Thus, the electrode units 2A and 2B engage with the indented shape of the middle plate 9, thereby the electrode units 2A and 2B being further prevented from moving in the X-direction and the Y-direction.

External Insulators

The external insulators 7A and 7B are, for example, molded polyphenylene sulfide. A first external insulator 7A is disposed between the positive-electrode external terminal 6A and the housing unit 4, and a second external insulator 7B is disposed between the negative-electrode external terminal 6B and the housing unit 4. The external insulators 7A and 7B are disposed on outer surfaces of the internal-terminal accommodating portions 412 of the housing unit 4. External-terminal accommodating concave portions 70 are provided in the external insulators 7A and 7B to accommodate the external terminals 6A and 6B. Heights of the external-terminal accommodating concave portions 70 are preferably greater than thicknesses of the external terminals 6A and 6B.

External Terminals

A positive-electrode external terminal 6A (for example, pressed aluminum material) is electrically connected to the first positive-electrode internal terminal 3A and the second positive-electrode internal terminal 3C, and a negative-electrode external terminal 6B (for example, pressed copper material) to the first negative-electrode internal terminal 3B and the second negative-electrode internal terminal 3D. Thicknesses of the external terminals 6A and 6B are equal to or less than the heights of the external-terminal accommodating concave portions 70 described above, so that the external terminals 6A and 6B do not protrude.

Fixing Members

A first fixing member 8A (for example, pressed aluminum material) fastens and fixings together the first positive-electrode internal terminal 3A, the first internal insulator 5A, the first housing member 41, the first external insulator 7A, and the positive-electrode external terminal 6A. A second fixing member 8B (for example, pressed aluminum material) fastens and fixes together the second positive-electrode internal terminal 3C, the first internal insulator 5A, the first housing member 41, the first external insulator 7A, and the positive-electrode external terminal 6A. A third fixing member 8C (for example, pressed copper material) fastens and fixes together the first negative-electrode internal terminal 3B, the first internal insulator 5A, the first housing member 41, the second external insulator 7B, and the negative-electrode external terminal 6B. A fourth fixing member 8D (for example, a copper material pressed product) fastens and fixes together the second negative-electrode internal terminal 3D, the first internal insulator 5A, the first exterior member 41, the second external insulator 7B, and the negative-electrode external terminal 6B.

Specifically, each of the fixing members 8A to 8D according to the present embodiment is a conductive swage pin and includes: a head portion 81; and a shaft portion 82 extending from the head portion 81. After the shaft portion 82 is inserted into a hole formed in a fixing target, a tip of the shaft portion 82 is swaged (squashed). Thus, the internal terminals 3A to 3D and the external terminals 6A and 6B can be electrically connected with the fixing target sandwiched and firmly fixed.

Arrangement of Terminals

According to the battery cell 1 configured as described above, the positive-electrode internal terminals 3A and 3C and the positive-electrode external terminal 6A are disposed on one side in the X-direction of the housing unit 4, and the negative-electrode internal terminals 3B and 3D and the negative-electrode external terminal 6B on the other side in the X-direction of the housing unit 4, which improves assemblability when the battery cells 1 are stacked to assemble the battery module.

Moreover, the positive-electrode external terminal 6A and the negative-electrode external terminal 6B are disposed on the same surface of two surfaces out of the housing unit 4 facing in the Z-direction, which improves the assemblability when the battery cells 1 are stacked to assemble the battery module.

Since the contact surfaces 51 of the internal insulators 5A and 5B with the electrode units 2A and 2B have the indented shape, and the internal insulators 5A and 5B are fixed to the housing unit 4, a jolt of the electrode units 2A and 2B caused by a jolt of the housing unit 4 can be suppressed by the indented shape of the internal insulators 5A and 5B. Thus, deterioration of the electrode units 2A and 2B is suppressed, thereby durability of the battery cell 1 being improved.

Battery Module

Next, a battery module 100 including the battery cells 1 according to the first embodiment will be described with reference to FIG. 6.

As shown in FIG. 6, the battery module 100 includes: a cell-stacked body 110 in which a plurality of the battery cells 1 is stacked; a pair of end plates 120 disposed at both ends in a stacking direction; insulating members 130 disposed between the battery cells 1 adjacent to each other or between the battery cells 1 and the end plates 120; bind bars 140 connecting the pair of the end plates 120; an internal bus bar 150 connecting the battery cells 1 electrically; and external bus bars 160 configured to connect the battery cells 1 and terminals for external connection (not shown) electrically.

Orientations of the stacked battery cells 1 in the X-direction are alternately reversed, so that the positive-electrode external terminal 6A of a battery cell 1 and the negative-electrode external terminal 6B of an adjacent battery cell 1 are arranged side by side in the Z-direction. Thus, the battery cells 1 can be easily connected in series by the internal bus bar 150.

Second Embodiment

Next, a battery cell 1B according to a second embodiment will be described with reference to FIGS. 7 and 8. Configurations similar to the first embodiment are denoted by the same reference numerals as those of the first embodiment, and the description of the first embodiment may be incorporated.

Battery Cell

Figure 7:
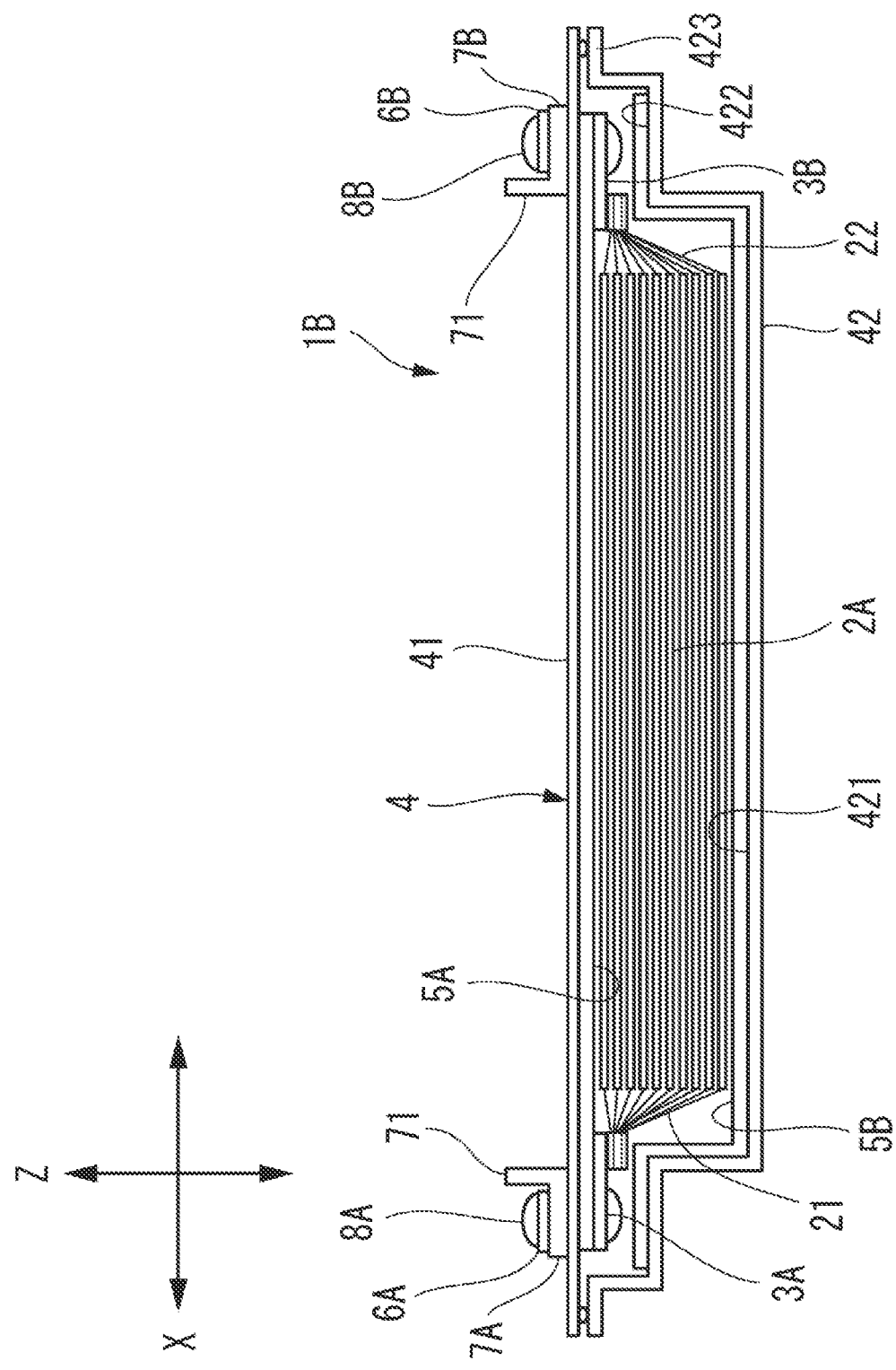
FIG. 7 is a sectional view of a battery cell according to a second embodiment of the present invention.

As shown in FIG. 7, the battery cell 1B according to the second embodiment differs from that according to the first embodiment in that: single electrode unit 2A is accommodated, a first housing member 41 to which the internal terminals 3A and 3B and the external terminals 6A and 6B are fixed has flat shape, and external insulators 7A and 7B include engagement portions 71 protruding in the Z-direction.

A distance between surfaces of the engagement portions 71 formed in the external insulators 7A and 7B facing each other in the X-direction is set to be equal to or slightly wider than a width of an outer surface of the electrode-unit accommodating portion 421 of the second housing member 42 in the X-direction. Thus, when the battery cells 1B are stacked in the Z-direction, the engagement portions 71 provided in the external insulators 7A and 7B of the battery cell 1B can engage with the housing unit 4 (electrode-unit accommodating portion 421) of the adjacent battery cell 1B to position the battery cells 1B in the X-direction.

Battery Module

Next, a battery module 200 including the battery cells 1B according to the second embodiment will be described with reference to FIG. 8.

Figure 8:
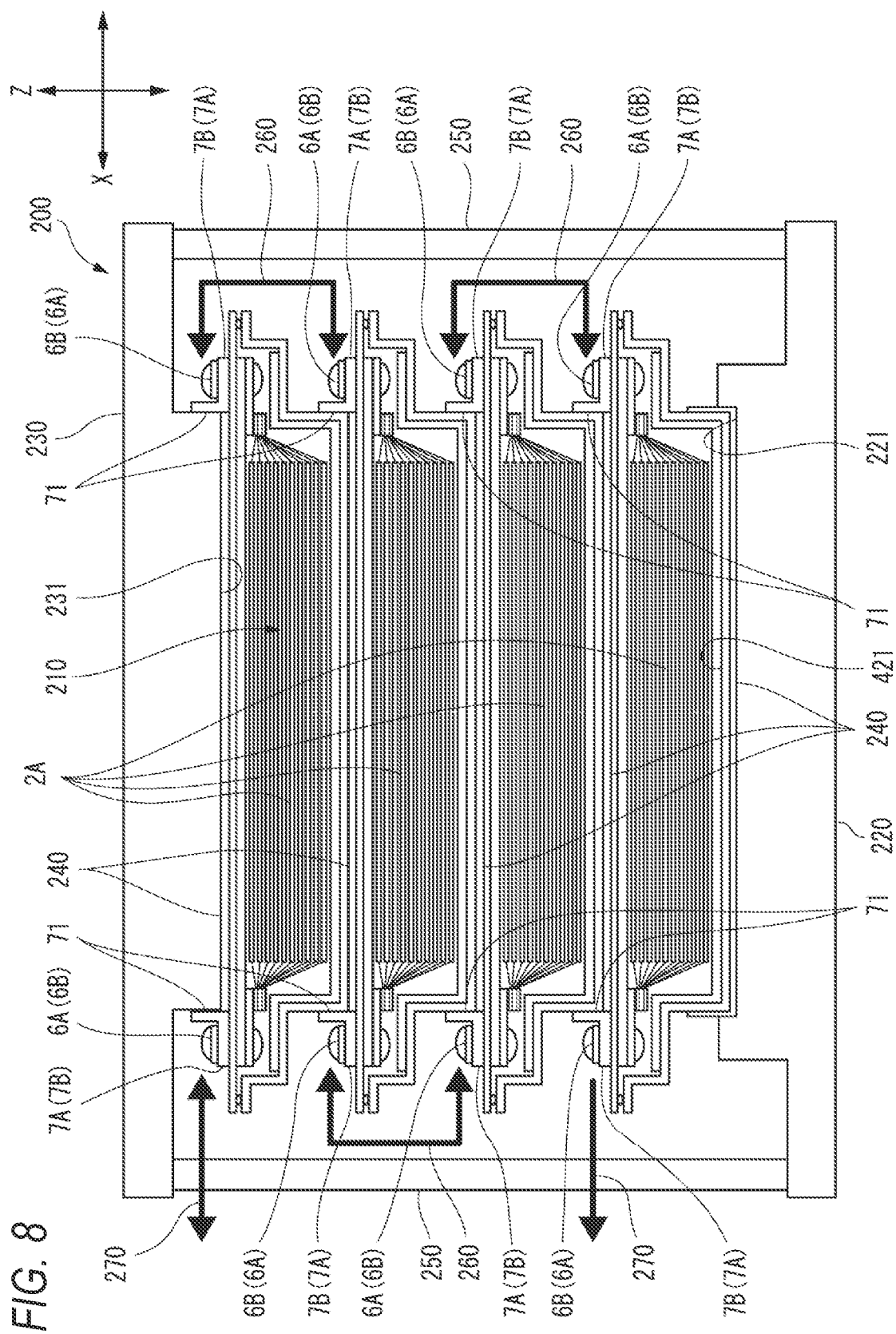
FIG. 8 is a sectional view schematically showing a battery module including the battery cell of FIG. 7.

As shown in FIG. 8, the battery module 200 includes: a cell-stacked body 210 in which a plurality of the battery cells 1B is stacked in the Z-direction; a pair of end plates 220 and 230 disposed at both ends in the stacking direction; insulating members 240 disposed between the battery cells 1B adjacent to each other or between the battery cells 1B and the end plate 220 or 230; bind bars 250 connecting the pair of the end plates 220 and 230; internal bus bars 260 connecting the battery cells 1B electrically; and external bus bars 270 configured to connect the battery cells 1B and terminals (not shown) for external connection electrically.

When the battery cells 1B are stacked in the Z-direction, the engagement portions 71 provided in the external insulators 7A and 7B of the battery cell 1B can engage with the housing unit 4 (electrode-unit accommodating portion 421) of the adjacent battery cell 1B to position the battery cells 1B in the X-direction.

The first end plate 220 on one side in the Z-direction includes a positioning concave portion 221 into which the electrode-unit accommodating portion 421 of the housing unit 4 can fit. Thus, it is possible to position at least the battery cell 1B adjacent to the first end plate 220 and that first end plate 220 in the X-direction.

The second end plate 230 on the other side in the Z-direction includes a positioning convex portion 231 having the same width in the X-direction as the electrode-unit accommodating portion 421 of the housing unit 4. That is, by engaging the engagement portions 71 of the battery cell 1B adjacent to the second end plate 230 with the positioning convex portion 231 of the second end plate 230, it is possible to position the battery cell 1B adjacent to the second end plate 230 and that second end plate 230 in the X-direction.

Although some embodiments have been described above with reference to the drawings, it goes without saying that the present invention is not limited thereto. It is apparent to those skilled in the art that various changes and modifications can be conceived within the scope of the claims, and it is also understood that such variations and modifications belong to the technical scope of the present invention. In addition, components in the embodiments described above may be combined arbitrarily unless it deviates from the gist of the present invention.

In the above embodiment, the following aspects are extracted. Although corresponding components in the embodiments described above are shown in parentheses, the present invention is not limited thereto.

(1) A battery cell (battery cell 1, 1B) including:
an electrode unit (electrode units 2A, 2B) including a positive electrode, a negative electrode, a current collector (positive-electrode current-collector 21, negative-electrode current-collector 22), and a separator;
a housing unit (housing unit 4) accommodating the electrode unit;
a first insulator (internal insulators 5A, 5B, electrode-unit insulating portion 52) disposed inside the housing unit and between the electrode unit and the housing unit;
an internal terminal (internal terminals 3A to 3D) disposed inside the housing unit and electrically connected to the current collector;
a second insulator (internal insulators 5A, 5B, internal-terminal insulating portion 53) disposed inside the housing unit and between the internal terminal and the housing unit; and
an external terminal (external terminals 6A, 6B) disposed outside the housing unit, in which
a contact surface (contact surface 51) of the first insulator with the electrode unit has indented shape, and
the first insulator is fixed to the housing unit.

According to (1), since the housing unit and the first insulator are fixed, a jolt of the electrode unit caused by a jolt of the housing unit can be suppressed by the indented shape of the first insulator. Thus, deterioration of the electrode unit is suppressed, thereby durability of the battery cell being improved.

(2) The battery cell according to (1), in which the internal terminal, the second insulator, the housing unit, and the external terminal are fastened together by a fixing member (fixing members 8A to 8D).

According to (2), since the internal terminal, the insulator, the housing unit, and the external terminal are fastened together by the fixing member, these members can be fixed easily without looseness.

(3) The battery cell according to (2), in which the fixing member is conductive.

According to (3), since the fixing member is conductive, the internal terminal and the external terminal can be electrically connected by the fixing member to reduce the number of components.

(4) The battery cell according to (1), in which the first insulator and the second insulator are integrally formed, and
the first insulator is fixed to the housing unit by fixation of the second insulator to the housing unit by the fixing member.

According to (4), the number of components can be reduced, and the first insulator can be easily fixed to the housing unit.

(5) The battery cell according to (1), further including:
an external insulator provided between the housing unit and the external terminal, in which
the second insulator is provided with a concave portion (internal-terminal accommodating concave portion 531) accommodating the internal terminal,
the external insulator is provided with a concave portion (external-terminal accommodating concave portion 70) accommodating the external terminal,
a thickness of the internal terminal is equal to or less than a height of the concave portion of the second insulator, and
a thickness of the external terminal is equal to or less than a height of the concave portion of the external insulator.

According to (5), the internal terminal and the external terminal do not protrude, thereby sizes of the internal terminal and the external terminal being reduced.

(6) The battery cell according to (1), in which the internal terminal includes a positive-electrode internal terminal (positive-electrode internal terminals 3A, 3C) and a negative-electrode internal terminal (negative-electrode internal terminals 3B, 3D),
the external terminal includes a positive-electrode external terminal (positive-electrode external terminal 6A) and a negative-electrode external terminal (negative-electrode external terminal 6B),
the positive-electrode internal terminal and the positive-electrode external terminal are disposed on one side of the housing unit in a longitudinal direction, and
the negative-electrode internal terminal and the negative-electrode external terminal are disposed on the other side of the housing unit in the longitudinal direction.

According to (6), since the positive-electrode terminals are provided on the opposite side of the negative-electrode terminals in the housing unit in the longitudinal direction, assemblability when the battery cells are stacked to assemble the battery module is improved.

(7) The battery cell according to (6), in which the positive-electrode external terminal and the negative-electrode external terminal are disposed on the same surface out of two surfaces of the housing unit facing in a thickness direction.

According to (7), since the positive-electrode external terminal and the negative-electrode external terminal are disposed on the same surface out of the two surfaces of the housing unit facing in the thickness direction, the assemblability when the battery cells are stacked to assemble the battery module is improved.

(8) The battery cell according to (1), in which the electrode unit includes a first electrode unit (electrode unit 2A) and a second electrode unit (electrode unit 2B) so disposed that sandwich a middle plate (middle plate 9), and contact surfaces of the middle plate with the first electrode unit and the second electrode unit each have indented shape.

According to (8), a jolt of the electrode unit caused by a jolt of the housing unit can be suppressed by the indented shape of the middle plate. Thus, deterioration of the electrode unit is suppressed, thereby durability of the battery cell being improved.

(9) A battery module (battery module 200) including:
a cell-stacked body (210) in which a plurality of the battery cells (battery cell 1B) according to (1) is stacked; and
a pair of end plates (end plates 220, 230) disposed at both ends in a stacking direction, in which
the external terminals of the battery cells adjacent to each other are electrically connected by a bus bar (internal bus bars 150, 260).

According to (9), the external terminals of the battery cells can be electrically connected easily.

(10) The battery module according to (9), in which
each of the battery cells further includes an external insulator (external insulators 7A, 7B) between the housing unit and the external terminal, and
the external insulator includes an engagement portion (engagement portion 71) engaging with the housing unit of the adjacent battery cell.

According to (10), the battery cells can be positioned by the external insulator of the battery cell engaging with the housing unit of the adjacent battery cell.

(11) The battery module according to (10), in which
the engagement portion of the external insulator of the battery cell adjacent to one of the end plates engages with the one of the end plates.

According to (11), the battery cell and the end plate can be positioned by the external insulator of the battery cell engaging with the adjacent end plate.

What is claimed is:

1. A battery cell comprising:
an electrode unit including a positive electrode, a negative electrode, a current collector, and a separator;
a housing unit accommodating the electrode unit;
a first insulator disposed inside the housing unit and between the electrode unit and the housing unit;
an internal terminal disposed inside the housing unit and electrically connected to the current collector;
a second insulator disposed inside the housing unit and between the internal terminal and the housing unit; and
an external terminal disposed outside the housing unit, wherein
a contact surface of the first insulator with the electrode unit has an indented shape,
a convex portion of the indented shape is a wire portion, and
the first insulator is fixed to the housing unit.

2. The battery cell according to claim 1, wherein
the internal terminal, the second insulator, the housing unit, and the external terminal are fastened together by a fixing member.

3. The battery cell according to claim 2, wherein
the fixing member is conductive.

4. The battery cell according to claim 1, wherein
the first insulator and the second insulator are integrally formed, and
the first insulator is fixed to the housing unit by fixation of the second insulator to the housing unit by the fixing member.

5. The battery cell according to claim 1, further comprising:
an external insulator provided between the housing unit and the external terminal, wherein
the second insulator is provided with a concave portion accommodating the internal terminal,
the external insulator is provided with a concave portion accommodating the external terminal,
a thickness of the internal terminal is equal to or less than a height of the concave portion of the second insulator, and
a thickness of the external terminal is equal to or less than a height of the concave portion of the external insulator.

6. The battery cell according to claim 1, wherein
the internal terminal includes a positive-electrode internal terminal and a negative-electrode internal terminal,
the external terminal includes a positive-electrode external terminal and a negative-electrode external terminal,
the positive-electrode internal terminal and the positive-electrode external terminal are disposed on one side of the housing unit in a longitudinal direction, and
the negative-electrode internal terminal and the negative-electrode external terminal are disposed on the other side of the housing unit in the longitudinal direction.

7. The battery cell according to claim 6, wherein
the positive-electrode external terminal and the negative-electrode external terminal are disposed on the same surface out of two surfaces of the housing unit facing in a thickness direction.

8. The battery cell according to claim 1, wherein
the electrode unit includes a first electrode unit and a second electrode unit so disposed that sandwich a middle plate, and
contact surfaces of the middle plate with the first electrode unit and the second electrode unit each have indented shape.

9. A battery module comprising:
a cell-stacked body in which a plurality of the battery cells according to claim 1 is stacked; and
a pair of end plates disposed at both ends in a stacking direction, wherein
the external terminals of the battery cells adjacent to each other are electrically connected by a bus bar.

10. The battery module according to claim 9, wherein
each of the battery cells further comprises an external insulator between the housing unit and the external terminal, and
the external insulator includes an engagement portion engaging with the housing unit of the adjacent battery cell.

11. The battery module according to claim 10, wherein
the engagement portion of the external insulator of the battery cell adjacent to one of the end plates engages with the one of the end plates.

12. The battery module according to claim 1, wherein
the wire portion is a mesh pattern.

13. The battery module according to claim 1, wherein
the wire portion is a hexagon-shaped pattern.

* * * * *